United States Patent [19]

Reinfelder et al.

[11] Patent Number: 5,645,670

[45] Date of Patent: Jul. 8, 1997

[54] METHOD FOR APPLYING A SKIN LAYER TO AN AIRFOIL STRUCTURE

[75] Inventors: William C. Reinfelder, Woodbridge; David A. Kovalsky, Shelton; Corey D. Jones, Prospect, all of Conn.

[73] Assignee: Sikorsky Aircraft Corp., Stratford, Conn.

[21] Appl. No.: 541,669

[22] Filed: Oct. 10, 1995

Related U.S. Application Data

[63] Continuation of Ser. No. 283,347, Aug. 1, 1994, Pat. No. 5,520,532.
[51] Int. Cl.[6] .................................................. B32B 31/04
[52] U.S. Cl. .......................... 156/212; 156/213; 156/245; 156/475; 156/493
[58] Field of Search ............................. 156/212, 213, 156/214, 285, 583.91, 245, 475, 493; 249/94, 96, 112, 134; 425/403, 123, 420, 500, 389

[56] References Cited

U.S. PATENT DOCUMENTS

| | | | |
|---|---|---|---|
| 2,655,459 | 10/1953 | Gordon et al. | 156/214 |
| 2,961,053 | 11/1960 | Prewitt et al. | 156/213 |
| 3,028,292 | 4/1962 | Hinds | 156/214 |
| 3,455,757 | 7/1969 | Ford et al. | 156/214 |
| 4,095,322 | 6/1978 | Scarpati et al. | 156/245 |
| 5,071,338 | 12/1991 | Dublinski et al. | 425/403 |
| 5,145,621 | 9/1992 | Pratt | 156/285 |
| 5,248,242 | 9/1993 | Lallo et al. | 156/285 |
| 5,354,195 | 10/1994 | Dublinski et al. | 156/285 |

*Primary Examiner*—Michele K. Yoder
*Attorney, Agent, or Firm*—William W. Jones

[57] ABSTRACT

A fiberglass or other material skin is applied to a composite airfoil structure in a mold assembly having a partially compliant caul plate component which defines the shape of the lower surface of the airfoil. The caul plate component includes a first portion which is essentially rigid and which covers the leading edge of the airfoil. The rigid portion of the caul plate component provides improved conformation of the airfoil skin to the leading edge of the airfoil. The caul plate component also includes a compliant portion which covers and defines the shape of the trailing edge of the lower surface of the airfoil. The stiffness of the caul plate component also has a variable stiffness zone which interconnects the rigid and compliant portions thereof. The use of rigid and compliant portions on the caul plate provides for a controlled conformance of the skin to the leading edge of the airfoil, while allowing the skin to accurately conform to the remainder of the airfoil in spite of variations in the dimensions of internal operating components of the airfoil.

2 Claims, 2 Drawing Sheets

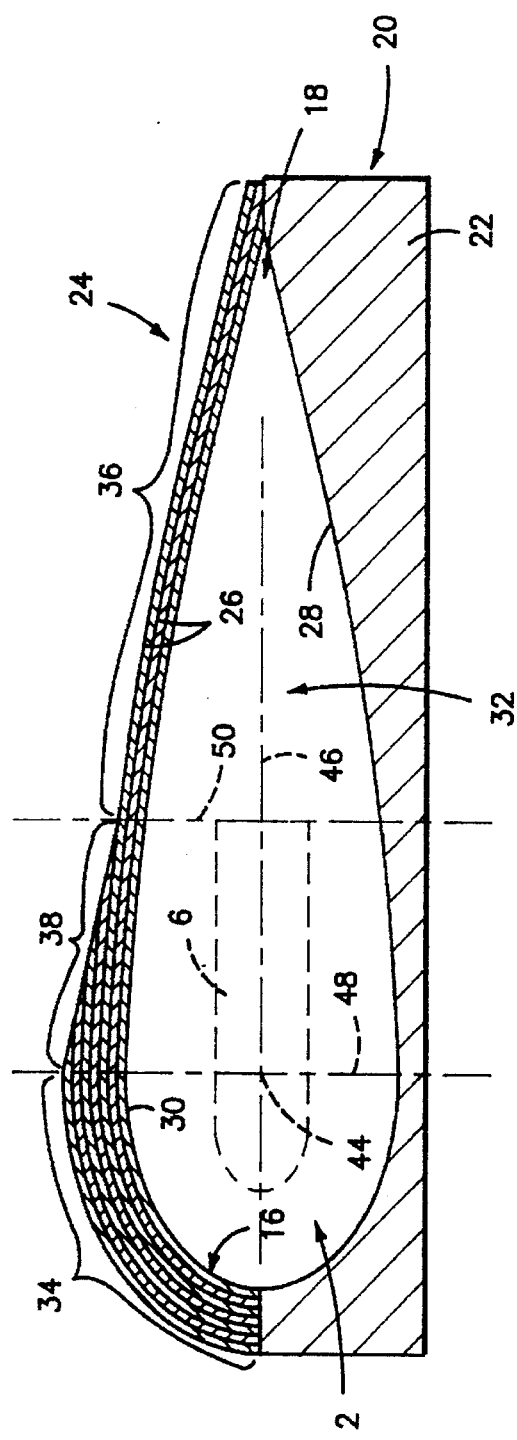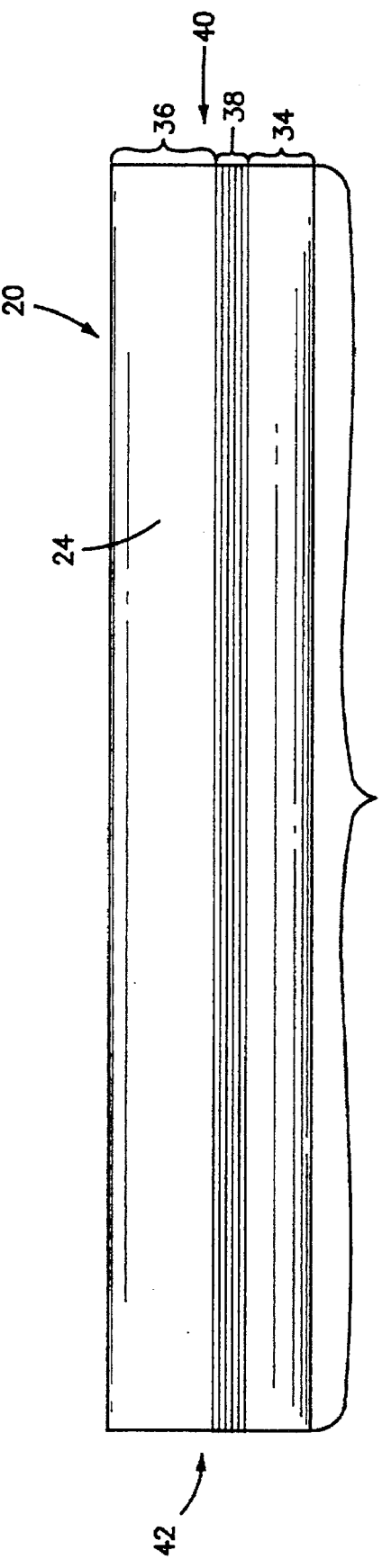

METHOD FOR APPLYING A SKIN LAYER TO AN AIRFOIL STRUCTURE

This is a division of U.S. Ser. No. 08/283,347, filed Aug. 1, 1994, now U.S. Pat. No. 5,520,532.

TECHNICAL FIELD

This invention relates to a method and apparatus for assembly bonding of an airfoil structure, such as a helicopter rotor blade.

BACKGROUND ART

Modern day airfoil assemblies such as helicopter rotor blades, flaps, ailerons, and the like, include internal components such as structural support components such as a rotor blade spar; airfoil-shaping honeycomb components; and the like. These airfoil assemblies include an external skin which forms an envelope for the airfoil, and is typically made of several plies of fiberglass or graphite impregnated with a resin matrix generally epoxy, which is referred to in the industry as "prepreg". The internal airfoil components are preassembled and then are positioned in a molding assembly which serves to locate and bond the external skin to the internal components of the airfoil. The molding assembly includes cooperating mold halves, which comprise a steel base mold member which has an internal cavity that conforms to the desired configuration of the upper or lower surface of the airfoil; and a complementary caul plate member which has an internal cavity that conforms to the desired configuration of the lower or upper surface of the airfoil. The steel mold is used for the most contour critical airfoil which is usually the upper airfoil.

Recent developments in forming composite articles such as helicopter components describe the use of molding assemblies with various configurations, which molding assemblies include a rigid mold member typically formed from steel, and a mating caul plate member which is compliant so as to improve the molding operation. U.S. Pat. Nos. 5,071,338 granted Dec. 10, 1991 to A. C. Dublinski, et al.; 5,087,187 granted Feb. 11, 1992 to R. J. Simkulak, et al.; and 5,152,949 granted Oct. 6, 1992 to P. B. Leoni, et al., all describe methods and tools for forming molded composite articles by the use of a mold assembly having a rigid mold member and a complementary compliant caul plate member. The compliant caul plate member is suggested for use in forming complex details in the article being manufactured (the 5,071,338 patent); and also for use in improving the ease of stripping the mold components away from the molded article after curing of the latter (the 5,152,949 patent). The molded articles described in each of the aforesaid patents are components of aircraft.

DISCLOSURE OF THE INVENTION

This invention relates to the use of a molding assembly for use in assembling the external skin of an airfoil for an aircraft, or the like, such as the rotor blade of a helicopter, and the internal structural components of the airfoil. The molding assembly of this invention includes a rigid mold body, preferably formed from steel, which has a cavity that defines the shape of the upper surface of the airfoil. The molding assembly also includes a complimentary caul plate which has an internal cavity that defines the shape of the lower surface of the airfoil. The caul plate has a forward edge section thereof which is essentially rigid throughout the length of the caul; and an opposite aft edge section which is essentially compliant. The caul plate also includes an intermediate section which has a declining rigidity and which interconnects the forward edge section and the aft edge section of the caul.

The essentially rigid forward edge section of the caul plate provides the capability of creating a precise airfoil surface by forcing the leading edge of the airfoil to conform to a predefined and relatively precise shape around the airfoil spar and other internal components. At the same time, the compliant aft edge section of the caul plate is forgiving of dimensional variations, all of which are within tolerance, which are associated with the machining of the honeycomb core portion aft of the spar, while maintaining a uniform pressure across the trailing portion of the airfoil.

The caul plate is preferably laminated from layers of preimpregnated fiberglass or graphite composite cloth. The cloth layers are preimpregnated with a resin such as epoxy that can withstand curing temperatures and are bonded to each other in layers to form the caul. The rigid forward edge portion of the caul plate will preferably include a greater number of prepreg composite sheet components than the compliant aft edge section thereof to provide the requisite stiffness requirements of each section of the caul plate. The relative stiffness and compliance of the edge sections of the caul plate are directly related to the stiffness of the fiberglass skin being applied to and bonded to the airfoil structure. The compliant edge section of the caul plate is preferably about 6 times more stiff than the airfoil skin. The rigid end section of the caul plate should be at least twice as stiff as the compliant edge section.

It is therefore an object of this invention to provide a method and apparatus for assembly bonding an airfoil structure with a leading edge molded to a precise airfoil shape and a trailing edge compliantly bonded to a honeycomb core. The leading edge section internal components allow adjustment to the precise shape through variable adhesive thickness. The trailing edge shape is compliant to the core contour with a uniform adhesive thickness.

It is a further object of this invention to provide a method and apparatus of the character described wherein the leading edge of the skin on the airfoil component is rigidly confined to the remainder of the airfoil to provide a precise leading edge shape for the airfoil.

It is an additional object of this invention to provide a method and apparatus of the character described wherein the trailing edge of the skin on the airfoil is compliantly applied to the core with a uniform pressure across the trailing edge of the airfoil.

It is another object of this invention to provide a method and apparatus of the character described wherein degree of confinement of the skin to the remainder of the airfoil at the leading and trailing edge is directly related to the stiffness of the airfoil skin and the internal structure.

These and other objects of the invention will become more readily apparent from the following detailed disclosure of an embodiment of the invention when taken in conjunction with the accompanying drawings, in which:

BRIEF DESCRIPTION OF THE DRAWINGS

FIG. 2 is a schematic sectional view of an apparatus formed in accordance with the invention; and FIG. 3 is a top plan view of the apparatus of FIG. 2.

BEST MODE FOR CARRYING OUT THE INVENTION

Figure 1:
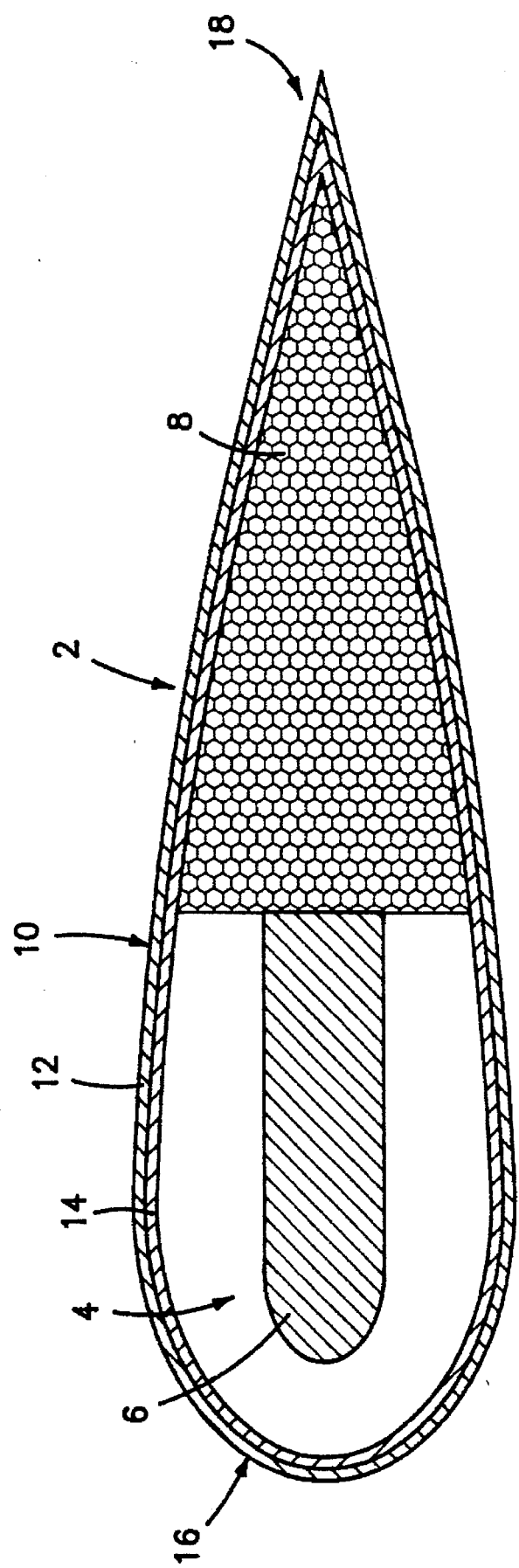
FIG. 1 is a schematic sectional view of an airfoil assembly which includes an external skin applied to an internal airfoil structure.

Referring now to the drawings, there is shown in FIG. 1 a typical helicopter rotor blade airfoil structure, which is denoted generally by the numeral 2. The rotor blade 2 has an internal structure denoted generally by the numeral 4 which includes a spar 6 which is a primary support member, and which is typically formed from metal or composite material; a honeycomb core part 8; and may also include tuning weights, a deicing system, etc. (not shown in detail). The rotor blade 2 has an outer skin of fiberglass prepreg 10 which for purposes of illustration is shown as a bilayer skin having two superimposed fiberglass sheet components 12 and 14. The leading edge of the rotor blade 2 is denoted generally by the numeral 16 and the trailing edge is denoted generally by the numeral 18.

Referring now to FIGS. 2 and 3, a somewhat schematic view of the molding assembly of this invention used to apply the skin 10 to the internal components 4 of the rotor blade 2 is shown, which molding assembly is denoted generally by the numeral 20. The molding assembly 20 includes two components, one of which is a rigid mold body 22 preferably formed from steel; and the other of which is a caul plate 24 which is preferably formed from superimposed layers of preimpregnated fiberglass sheets 26. The internal surfaces 28 and 30 of the mold body 22 and caul plate 24 are configured in conformance with the desired shape of the outer surface of the rotor blade skin. It will be understood that the rotor blade fiberglass skin sheets are applied to the internal blade components so as to cover the latter, and the composite assembly is positioned in the mold cavity. Either a vacuum or positive pressure is applied over the caul plate. Adhesives used are generally elevated temperature curing. The position of the blade spar is denoted by the numeral 6 and is shown in phantom.

The caul plate 24 is formed from a plurality of fiberglass or graphite prepreg sheets 26, and includes a thick forward edge section 34 which overlies the leading edge portion 16 of the rotor blade assembly 2; a relatively thin aft edge section 36 which overlies the trailing edge portion 18 of the rotor blade; and an intermediate section 38 wherein the thickness of the caul plate 24 gradually declines from the leading edge 16 to the trailing edge 18 of the rotor blade 2. The preferred way of forming the thicker and thinner caul plate edge sections 34 and 36 is by gradually reducing the number of composite plies 26 which make up the caul plate 24 through the intermediate section 38 of the caul. Thus the number of composite plies 26 which make up the caul plate section 34 could, for example, be seven; and the number of composite plies 26 which make up the caul plate section 36 could, for example, be three. The number of composite plies which make up each section of the caul plate 24 will be determined by the target stiffness of the fiberglass skin 10 on the rotor blade 2, as clarified herein.

The boundaries of the caul plate sections 34, 38 and 36 are determined as follows. The location of the airfoil spar 6 within the molding cavity 32 governs the boundaries of the caul plate sections 34, 36 and 38. The spar 6 encapsulates and defines the blade pitch axis 44 which corresponds to the feathering axis of the blade 2. A line 46 which extends through the pitch axis 44 and the trailing end 18 of the blade 2, and essentially bisects the leading edge 16 of the blade is termed the "chord line". A line 48 which is perpendicular to the chord line 46 and extends through the pitch axis 44 defines on the outer surface of the caul plate 24 one end of the thick edge section 34 of the caul plate 24, and the beginning of the intermediate section 38 of the caul plate 24 where the thickness of the caul plate tapers off. A line 50 which is parallel to the line 48 and is tangent to the trailing edge of the spar 6 defines the end of the intermediate section 38 on the outer surface of the caul plate 24, and the beginning of the thin compliant caul plate section 36, which extends to the trailing edge of the caul. By providing the caul plate 24 with a stiff, essentially rigid section 34 whose surface 30 defines the configuration of the leading edge 16 of the rotor blade 2, the portion of the outer skin 10 underlying the caul plate section 34 will form a relatively precise and well controlled predefined shape on the leading edge portion of the rotor blade 2. At the same time, by providing the caul plate 24 with a flexible and compliant trailing section 36, the portion of the outer skin 10 underlying the caul plate section 36 will be flexibly applied to the inner trailing edge blade components in a manner that is tolerant of dimensional variations while maintaining a uniform pressure across the trailing portion of the blade outer skin. These forming conditions will be found from the root end to the tip end of the blade 2 due to the fact that the caul plate sections 34 and 36 extend for the full width W of the caul plate 24, as shown in FIG. 3. The resulting blade will thus have an outer skin which is substantially uniform in each edge section from the root to the tip of the blade.

It will be readily appreciated that the forming assembly and process of this invention will provide an airfoil which has a tightly controlled leading edge section shape while at the same time allowing for internal component dimensional variations in the trailing edge section of the airfoil. The airfoil-forming mold assembly includes a caul plate member which has an essentially rigid leading edge section and a compliant trailing edge section which provides the desired control and flexibility during the forming of the airfoil. The degree of caul plate stiffness and compliance is directly related to the desired stiffness of the skin being applied in the airfoil.

In view of the fact that variations and changes may be made to the disclosed embodiment without departing from the spirit of the invention, it is not intended to limit the invention otherwise than as required by the appended claims.

What is claimed is:

1. A method of applying an outer skin layer to an airfoil having a chord line, a pitch axis, a leading edge section, and a trailing edge section, said method comprising the steps of:
   a) applying a uniform substantially rigid pressure to said skin layer in said leading edge section of the airfoil to provide said skin with a highly controlled curvature over the leading edge section of the airfoil; and
   b) concurrently applying a uniform compliant pressure to said skin layer in said trailing edge section of the airfoil so as to provide a uniform pressure on said skin across said trailing edge section of the airfoil which is operable to smoothly conform said skin layer to said trailing edge section despite dimensional variations of internal airfoil components.

2. The method of claim 1 wherein said rigid pressure is applied to said skin layer in an area of the airfoil which lies on the leading edge section side of a line which passes through said pitch axis and is perpendicular to said chord line.

* * * * *